United States Patent
Thakar et al.

(10) Patent No.: US 6,475,538 B2
(45) Date of Patent: Nov. 5, 2002

(54) PROCESS FOR MOZZARELLA CHEESE

(75) Inventors: Hiren H. Thakar, Palatine, IL (US); David Webb Mehnert, Lake Villa, IL (US); Wendy Munz, Naperville, IL (US); Mohamed Saad Kettani, Schaumburg, IL (US); William J. Zaikos, Chicago, IL (US); Amanda Young, Dayton, OH (US); Michael Robert Fournier, Chicago, IL (US); Mark Gurevich, Buffalo Grove, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 4 days.

(21) Appl. No.: 09/759,581

(22) Filed: Jan. 10, 2001

(65) Prior Publication Data

US 2002/0127301 A1 Sep. 12, 2002

(51) Int. Cl.$^7$ .................................................. A23C 9/12
(52) U.S. Cl. ............................ 426/43; 426/34; 426/36; 426/42; 426/582
(58) Field of Search ................................ 426/582, 580, 426/34, 36, 42, 43

(56) References Cited

U.S. PATENT DOCUMENTS

| | | | |
|---|---|---|---|
| 3,692,540 A | 9/1972 | Mauk | 99/116 |
| 4,898,745 A | 2/1990 | Zamzow et al. | 426/582 |
| 5,030,470 A * | 7/1991 | Kielsmeier et al. | 426/582 |
| 5,200,216 A | 4/1993 | Barz et al. | 426/36 |
| 5,234,700 A * | 8/1993 | Barz et al. | 426/42 |
| 5,567,464 A | 10/1996 | Barz et al. | 426/582 |
| 5,902,625 A | 5/1999 | Barz et al. | 426/582 |
| 5,925,398 A * | 7/1999 | Rizvi et al. | 426/582 |

* cited by examiner

*Primary Examiner*—Leslie Wong
(74) *Attorney, Agent, or Firm*—Fitch, Even, Tabin, & Flannery

(57) ABSTRACT

The present invention is directed to an improved process of producing natural mozzarella cheese. The process starts with a liquid dairy substrate that is cultured and coagulated. The resulting curd is cut and salted. The resulting curd (i.e., base curd) may be frozen or refrigerated and stored until needed. Once needed, the stored base curd is ground and treated in a blender where it is partially standardized to form a "partially standardized base curd." The partially standardized base curd is then cooked in a cooker or cooker/stretcher (preferably in a lay-down cooker) where standardization is completed by the addition of a cultured or uncultured skim milk retentate. No emulsifying salts are used in the cooker/stretcher. The cheese mass is then rapidly cooled to produce the mozzarella cheese. The conventional brine cooling step normally used in mozzarella cheese production is not used in the present invention. In an especially preferred embodiment, starch is also added to the standardized, cooked, stretched mozzarella prior to the cooling step. Such starch is typically added at a level of up to about 10 percent of the finished product and, more preferably, at a level of about 0.1 to about 2 percent. The added starch serves to bind the moisture in the product and results in a firmer cheese which is easier to shred.

18 Claims, 1 Drawing Sheet

PROCESS FOR MOZZARELLA CHEESE

FIELD OF THE INVENTION

Figure 1:
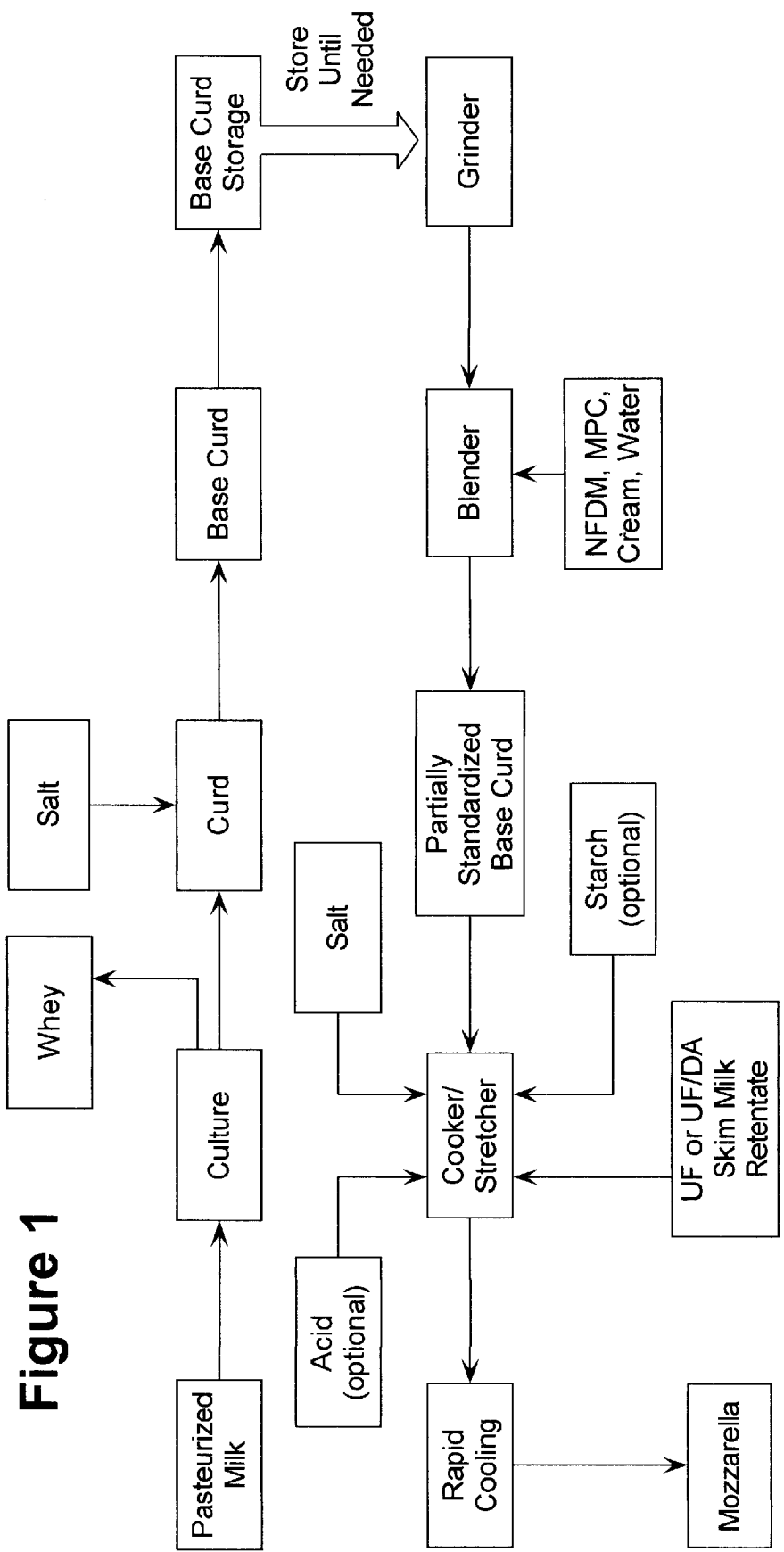

The present invention is directed to cheese products. More particularly, the present invention is directed to an improved process for producing premium quality mozzarella-type cheese products, including natural mozzarella cheeses.

BACKGROUND OF THE INVENTION

U.S. Pat. No. 5,567,464 describes a process of making a mozzarella cheese comprising treating milk to obtain curd and whey, draining the curd, cutting the coagulum, heating, kneading and stretching the cheese, forming the cheese into a shape, cooling the cheese in cold brine, and removing the cheese from the brine to result in mozzarella cheese. A food additive may be added to the cheese after it has been heated, kneaded and stretched, but before it is formed into a shape.

U.S. Pat. No. 5,200,216 describes a continuous process of making a mozzarella cheese without aging. The curd is heated, kneaded, stretched, and extruded directly into cold brine. Salt may be added during the kneading step. After brining, the cheese should be used immediately or frozen.

U.S. Pat. No. 5,902,625 describes a process of manufacturing a soft or semi-soft fibrous cheese wherein a food additive is added to the curd after it has been heated, kneaded, and stretched. The cheese is then formed into a shape by pumping it through an extruder. The cheese is then cooled in cold brine.

U.S. Pat. No. 3,692,540 describes a method for the formation of a pasta filata cheese. Curd is formed from milk by the addition of lactic acid producing bacteria. The whey is drained away, and salt is added directly to the curd. The curd is then transferred to cheese hoops where it is pressed for about one hour. The curd is kept in the hoops for a period of 24 hours to several months, removed from the hoops, and broken into pieces. It is then transferred to a cheese cooker and heated to temperatures ranging from 130 to 160° F. The cheese is held at an elevated temperature for about 5 minutes before packaging.

U.S. Pat. No. 4,898,745 describes a process for manufacturing a pasta filata cheese with extended shelf life. The process provides for the heating and cooling of the cheese curd in two phases. The heating is accomplished through a combination of auger conveyor and direct steam injection, and the cooling is achieved through a combination of a vacuum chamber and traditional molding and packaging methods.

Although a number of procedures have been developed for the production of mozzarella cheese, there still remains the need for improved processes. In particular, it would be advantageous to provide improved processes in which an intermediate product could be formed which can be stably stored until it is desired that the finished mozzarella cheese is to be prepared. The present invention provides such improvement, as well as other improvements, in the production of mozzarella cheese.

DETAILED DESCRIPTION OF THE DRAWING

FIG. 1 is a schematic flow diagram generally depicting the process of the present invention.

SUMMARY OF THE INVENTION

The invention relates to an improved process of producing natural mozzarella cheese. The process starts with a liquid dairy substrate that is cultured and coagulated. The resulting curd is cut and salted. The resulting curd (i.e., base curd) may be frozen or refrigerated and stored until needed. Once needed, the stored base curd is ground and treated in a blender where it is partially standardized to form a "partially standardized base curd." The partially standardized base curd is then cooked in a cooker or cooker/stretcher (preferably in a lay-down cooker) where standardization is completed by the addition of a cultured or uncultured skim milk retentate and salt. No emulsifying salts are required in the cooker/stretcher. The cheese mass is then rapidly cooled to produce the mozzarella cheese. The conventional brine cooling step normally used in mozzarella cheese production is not used in the present invention.

In an especially preferred embodiment, starch is also added to the standardized, cooked, stretched mozzarella prior to the cooling step. Such starch is typically added at a level of up to about 10 percent of the finished product and, more preferably, at a level of about 0.1 to about 2 percent. The added starch serves to bind the moisture in the product and results in a firmer cheese which may be easier to shred. Although emulsifying salts are not required, addition of emulsifying salts prior to the cook step can provide benefit during rapid cooling and packaging, by reducing or eliminating moisture separation from the cheese mass during the manufacture of mozzarella cheese products.

One advantage of the present invention is that cheese base curd may be stored for extended period under frozen or refrigerated conditions until, at the appropriate time, it is further processed to produce mozzarella cheese products, including natural mozzarella cheese. This is an economic advantage, as curd may be produced at periods of the year where, for example, starting materials are readily available or production facilities are availible, and resulting curd converted to cheese at other times such as for, example, when the demand for mozzarella cheese is high or production facilities are available. Moreover, standardization of the fat, salt, moisture, protein, pH, and other cheese attributes in the later stages of the manufacturing process as provided for in this invention also allows for a more economical usage of raw materials in the finished product. The process permits the production of curd, and its usage at times when (1) the base curd may be most economically produced and then stored under frozen or refrigerated conditions; (2) other components such as fat, salt, protein, and the like are most economical; and (3) production of mozzarella cheese is most in demand by the consumer.

Conventional mozzarella cheese manufacture typically requires that the mozzarella cheese is slow cooled in brine tanks; unless extreme care is taken, microbial contamination can occur during brine cooling. The improved process of this invention allows rapid cooling of the curd and the use of dry salt (as opposed to brine) which significantly reduces the risk of microbial contamination. The present process, therefore, generally produces a higher quality finished product. The present process also provides an extended cutting window (i.e., optimal time period after manufacture that the cheese can be converted to shreds or other forms); generally the cutting window using the present process is up to about 8 weeks as compared to about 3 weeks with the conventional process. Elimination of the conventional slow cooling step and the brink tank represents significant advantages in terms of both manufacturing costs and quality control.

DETAILED DESCRIPTION OF THE PREFERRED EMBODIMENTS

Generally, in accordance with the present invention, stringy and rich melting natural cheese products are provided which have the firm textured functional body characteristics of a young mozzarella cheese. A fluid media is provided containing non-fat milk solids and fat. Acidity is developed in the media which is set with rennet to provide a coagulum. The coagulum is then cut to provide curd and whey. The whey is drained from the base curd; this drained but unstandardized curd is held to develop a predetermined level of acidity (i.e., a pH of about 5.0 to about 5.8). The resulting curd, if desired, can be washed with water and be salted. This so-called base curd may be frozen or refrigerated until needed. Generally, this curd will have a fat content (on dry basis) of about 48.5 to about 52.5 percent, about 32 to about 37 percent moisture, about 1.4 to about 2.0 percent salt, and a pH of about 5.0 to about 5.8; more preferably, the resulting curd will have a fat content (on dry basis) of about 50 to about 51 percent, about 34 to about 35 percent moisture, about 1.4 to about 1.8 salt, and a pH of about 5.1 to about 5.3.

Once needed, the stored base curd is ground and treated in a blender where it is partially standardized to form a "partially standardized base curd." The partially standardized base curd is then cooked in a cooker or cooker/stretcher (preferably in a lay-down cooker) where standardization is completed by the addition of a cultured or uncultured skim milk retentate and salt. The cheese mass is then rapidly cooled to produce the mozzarella cheese. Generally, the resulting mozzarella cheese will have a fat content (on dry basis) of about 40.5 to about 44.5 percent, about 40 to about 51.5 percent moisture, about 1.4 to about 2.0 percent salt, and a pH of about 5.0 to about 5.4; more preferably, the resulting mozzarella cheese will have a fat content (on dry basis) of about 42 to about 43.5 percent, about 50 to about 51 percent moisture, about 1.4 to about 1.8 salt, and a pH of about 5.1 to about 5.3.

For purposes of this invention, "base curd" is unstandardized and does not meet the standards of identity for mozzarella cheese. "Partially standardized" is an intermediate cheese blend prepared from the base curd and other diary ingredients; it generally does not meet the standards of identity for mozzarella cheese. Typically, the "partially standardized" cheese blend will have a fat content (on dry basis) of about 46.5 to about 49.5 percent, a moisture of about 34.0 to about 42.0 percent, and a protein content of about 20.5 to about 22.5 percent. The specific analytical targets for the "partially standardized" cheese blend will be dependent upon the exact composition of the "base curd."

Prior to the present invention, manufacturers of mozzarella cheese and/or manufacturers of process cheese and imitation cheese were limited in their ability to control the timing of the process of manufacturing such cheeses. The present invention enables the manufacturer to produce varieties of mozzarella cheese and mozzarella-like products which meet all of the desired melt characteristics, independent of the application, while not altering the overall handling/portioning qualities of the cheese, at a wide variety of times, as determined by the manufacturer. Importantly, this invention employs a step in the manufacturing of mozzarella cheese in which the base curd can be is frozen or stored at refrigerated temperatures and later converted to the final product. Generally, frozen curd can be stored up to about 4 months; refrigerated curd can be stored up to about 2 months.

The general process of this invention is show in FIG. 1. The fluid media which is used to prepare the base curd contains non-fat mild solids and fat. Preferably the fat content ranges from about 2 to about 5 percent and is more preferably about 3 to about 4 percent. The protein content ranges from about 2 to about 5 percent and is, more preferably, about 3 to about 4 percent. The non-fat milk solids may be provided from whole milk, reconstituted dried non-fat milk solids, concentrated milk, or skim milk. The fat may be milk fat, butter fat, or other suitable fat. The fat may be provided from whole milk, or partially skimmed milk; alternatively, other suitable fats may be added to the fluid medium. Thus, for example, the mozzarella cheese products prepared from this process can range from low moisture skim milk mozzarella to low moisture partially skim milk mozzarella to low moisture whole milk mozzarella.

Acidity is developed in the fluid media by the addition of a lactic-acid producing culture at a level of about 0.5 to about 1.5 percent. Examples of suitable lactic acid-producing cultures include *Streptococcus lactis*, *Lactococcus lactis*, Lactobacillus, and the like. Generally cultures containing both mesophilic and thermophilic cultures are preferred; preferably the lactic acid-producing culture is selected from the group consisting of *Streptococcus lactis*, *Lactococcus lactis*, and mixtures thereof. The resulting mixture is allowed to ripen for approximately about 20 to about 40 minutes, and more preferably about 30 minutes, at a temperature of about 88 to about 92° F. to obtain a pH of about 6.5 to about 6.8. Preferably the pH is developed to about 6.5 to about 7. A coagulating agent (e.g., rennet such as Chymosin generally at about 0.009 to about 0.01 percent and more preferably about 0.0095 percent) is used to form a coagulum; the mixture is permitted to set at about 88 to about 92° F. for about 20 to about 40 minutes, and more preferably at about 90° F. for about 30 minutes. The coagulum is then cut and the temperature raised to about 90 to about 102° F. over a period of about 20 to 60 minutes, and preferably to about 98 to about 101° F. over a period of about 28 to about 32 minutes. After this cooking step, the curd is held at elevated temperatures of about 5 to about 15 minutes, and more preferably for about 10 minutes. About 30 to about 40 percent of the whey is removed; the remaining curd and whey is agitated for about 20 minutes. At this time, the pH of the curd is between about 5.5 and about 6.2, and more preferably between about 5.7 and about 6. After the remaining whey is drained, the resulting curd is termed "base curd" since it can be stored for significant periods of time under proper conditions until needed for the production of the final mozzarella cheese.

Salt, if desired, can be added to the base curd at a level of 0 to about 2 percent, preferably about 1.4 to about 1.8 percent, and most preferably about 1.7 percent. The base curd is transferred to suitable containers (e.g., 500 lb. barrels) and pressed at about 30 psi vacuum for about 75 minutes to help remove additional whey. The containers can be sealed for storage. The base curd can be stored at refrigeration temperatures (i.e., about 35 to about 45° F.) for up to about 2 months. Alternatively, the base curd can be stored frozen for us to about 4 months.

When it is desired to prepare the final cheese, the base curd is removed from the containers, ground into small pieces, and placed in a suitable blender; a ribbon or similar blender is generally preferred. Cream (including sweet cream, reconstituted cream, and plastic cream) and non-fat dry milk are then added at levels to provide about 0.1 to about 2 percent sweet cream, preferably about 0.5 to about 1.5 percent, and about 1 to about 4 percent non-fat dry milk, preferably about 2.0 to 3.0 percent, in the final cheese product. The ingredients are blended at a temperature of about 45 to about 55° F. until thoroughly mixed (generally about 10 to about 15 minutes) to form a "partially standardized base curd."

Partially standardized base curd from the blender, salt, and a skim milk retentate (preferably cultured) are then introduced into a suitable cooker at a temperature of about 50 to about 70° F., preferably at about 55 to 65° F., and cooked at about 140 to about 165° F. for less than about 10 minutes, preferably at about 152 to about 160° F. for about 2 to about 4 minutes. The addition of salt and the skim milk retentate completes standarization. Preferably, the cooker is a conventional direct steam injection lay-down cooker/stretcher. Salt and skim milk retentate are added at levels to provide 0 to about 2 percent salt, preferably about 1.6 to about 1.8 percent, and about 20 to about 30 percent skim milk retentate, preferably about 23 to 27 percent, in the final cheese product. If desired, an edible acid (e.g., acetic acid, lactic acid, and the like) can be added to adjust the pH to about 5.0 to about 5.6, and preferably about 5.2 to about 5.4.

Final standardization of fat, salt, moisture, protein, and pH in the later stages of the process (i.e., in the blender or cooker) allows for better control and consistency of the final product. Except for the skim milk retentate, all standardizing ingredients may be added either in the blender used to produce the partially standardized base curd or in the cooker. It has been found, however, that addition of the skim milk retentate to the blender and holding it in the blender for any significant time period (i.e., more than about 30 minutes) generally results in unacceptable cheese products. Thus, the skim milk retentate should be added to the partially standardized base curd in the cooker. Where standardizing ingredients other than skim milk retentate are added to the base curd in the cooker, formation of the partially standardized base curd is considered to occur in situ and the skim milk retentate is considered to be added to the partially standardized base curd to complete standardization.

The skim milk retentate is preferably prepared from pasteurized skim milk using ultrafiltration (UF) (alone or in combination with diafiltration (DF)) using conventional UF or UF/DF techniques. The skim milk retentate is used to standardize the cheese mixture in the cooker/stretcher. Typically, the UF or UF/DF skim milk retentate contains about 23 to about 25 percent total solids, and preferably about 24 percent total solids; about 19 to about 21 percent protein, and preferably about 20 percent protein; and about 1.5 to about 2.5 percent lactose, and preferably about 2 percent lactose. Typically, the UF or UF/DF skim milk retentate is concentrated by a factor of about 5× to about 7×, and more preferably to about 6×. If desired, the UF or UF/DF skim milk retentate may be cultured prior to addition in the cooker/stretcher. In that case, the UF or UF/DF skim milk retentate is preferably pasteurized, cooled, and transferred into tanks for culturing. Salt may be added at levels up to about 1 percent to lower the viscosity and aid in processing. A lactic acid-producing culture is added and the culture is allowed to ripen to pH 4.7 to 6.0, and more preferably to about 5.1 and about 5.7. Once the desired pH is achieved, the temperature of the cultured retentate is lowered to about 45° F. for storage. The cultured retentate is preferably used within about 36 hours after cooling, more preferably within about 16 hours, and most preferably with about 8 hours. Preferably, the UF or UF/DF skim milk retentate is cultured; culturing appears to improve the performance of the product when rapid cooling is carried out using a chill roll cooling unit. The use of cultured UF or UF/DF skim milk retentate also appears to improve the stretching qualities of the cheese; such properties are especially important when the cheese is used in pizzas.

As shown in FIG. 1, the partially-standardized base curd, which is produced in the blender, is transferred into the cooker/stretcher. Preferably the cooker/stretcher is a direct steam injection lay-down cooker/stretcher. The cooker/stretcher is operated at a temperature of about 140 to about 165° F., and more preferably at about 152 to about 160° F. Simultaneously, the UF or UF/DA skim milk retentate (which preferably has been cultured as discussed above) and salt are added to the cooker/strecher at levels of about 20 to about 30 percent and 0 to about 2 percent, respectively, and preferably about 23 to 25 percent and about 0.2 to 0.5 percent, respectively. The order of addition of the ingredients to the cooker/stretcher is important. In particular, the UF or UF/DF skim milk retentate should be added in the last standardization step (i.e., by direct addition to the cooker/stretcher) to maintain acceptable cheese consistency and texture during the cooking process. Generally, the other ingredients (i.e., non-fat dry milk, milk protein concentrate, cream, and water) can be added in the blender or directly to the cooker/stretcher. Generally, however, it is somewhat more convenient to added these other ingredients in the blender.

The conditions in the cooker/stretcher should be carefully controlled. As noted, the cooker/stretcher is preferably a direct steam injection lay-down cooker/stretcher. Using this type of cooker/stretcher, the mixture is heated to a temperature of about 140 to about 165° F., and more preferably to about 156 to about 160° F., using continuous direct steam injection with a cheese mass residence time of less than about 10 minutes, preferably about 2 to about 4 minutes. Temperatures above about 170° F. are to be avoided since the cheese emulsion will have a tendency to breakdown. The steam pressure should be between about 30 and about 60 psi during the cook cycle. The amount of water added to the product through direct steam heating and process water adjustments in the cooker is between about 2 and about 8 percent of the total finished product, and more preferably about 6 percent of the total finished product. A minimum hold time of at least two minutes in the cooker/stretcher at temperature allows (a) formation of a stable cheese emulsion; (b) alignment of the protein in the cheese matrix to allow for stretchability in the finished product; and (c) destruction of vegetative pathogens. Generally, residence times greater than about 10 minutes and/or temperatures greater than about 170° F. should be avoided; otherwise the cheese mass tends to break down creating emulsion instability which can lead to a "soupy" mixture in the cooker.

From the cooker/stretcher, the molten cheese is then rapidly cooled. Preferably, the molten cheese mass is transferred to a surge tank and then fed by gravity to a chill roll cooler. The molten cheese can formed, for example, into sheets over ammonia-chilled rollers; preferably, the molten cheese is cooled to a temperature of about 50 about 60° F., more preferably about 55° F., in less than about 4 minutes. The sheet of cheese can be cut into ribbons. The ribbons can be stacked, cut lengthwise, and placed in suitable containers (e.g., 500 pound barrel). Once the containers are full, the cheese is pressed and the containers sealed. The filled cheese containers are then placed in a suitable cooler in order to lower the overall cheese temperature to less than about 50° F. within 72 hours. The cheese may be stored at refrigerated or frozen temperatures until use.

Although a chill roll cooler is preferred, other conventional rapid cooling techniques can also be used so long as the overall cheese temperature is lower to less than about 60° F. within 24 hours and less than about 50° F. within 72 hours. Additionally, the mozzarella cheese can be hot packed into appropriate containers and then cooled if desired. Importantly, cooling in a conventional brine tank is not required and, more specifically, is eliminated by the practice of this invention.

If desired, and as also shown in FIG. 1, starch can be added to the cheese mass in the cooker/stretcher prior to the cooling step. Starch is preferably added at a level of up to about 4 percent of the finished product, and preferably at about 0.1 to about 2 percent. While not wishing to be limited by theory, it is believed that the starch binds the moisture in the product, producing a firmer cheese which is easier to shred. Without starch, the resulting mozzarella cheese can be shredded at a temperature of about 22 to 24° F.; with starch added at a level of about 2 percent, the shredding temperature increases to about 25 to about 35° F.

Cheese shreds and cheese shred blends (i.e., inventive mozzarella blended with other cheeses) have been evaluated for taste, texture, and other organoleptic properties. Additionally, evaluations have also been carried out using the inventive mozzarell cheese as a pizza topping. These tests demonstrate that the mozzarella cheese prepared by the present process is comparable to conventionally-made mozzarella cheese. A summary of some of these results are provided in Tables 1 and 2 below.

TABLE 1

| CHEESE SHRED BLENDS* | Overall Liking (Melted-Hot) | Overall Liking (Plain-Cold) | Appearance Liking | Flavor Liking |
| --- | --- | --- | --- | --- |
| Mozz./Cheddar (Control) | 7.5 | 7.5 | 7.5 | 7.5 |
| Inventive LMPS**/Cheddar | 7.6 | 7.4 | 7.6 | 7.6 |
| Inventive LMWM***/Cheddar | 7.6 | 7.4 | 7.6 | 7.6 |
| Mozz./Parmesan (Control) | 7.3 | 7.2 | 7.6 | 7.1 |
| Inventive LMPS**/Parmesan | 7.2 | 7.0 | 6.9 | 6.9 |
| Inventive LMWM***/Parmesan | 7.3 | 7.0 | 7.1 | 7.3 |

*The indicated cheeses, both hot and cold, were evaluated) by female heads-of-household (100 respondents per variable; 21–70 years of age). Attributes were evaluated on a scale from 1–9, with 9 indicating "Extremely liked."
**LMPS is inventive Low Moisture Part Skim Mozzarella.
***LMWM is inventive Low Moisture Whole Milk Mozzarella.

TABLE 2

| FROZEN PIZZA* | Overall Liking | Overall Appearance | Overall Flavor Liking | Cheese Texture Liking |
| --- | --- | --- | --- | --- |
| Control 1 | 6.5 | 6.5 | 6.6 | 6.5 |
| Control 2 | 6.7 | 6.6 | 6.4 | 6.4 |
| Inventive (LMPS**) | 6.9 | 6.6 | 6.7 | 6.6 |
| Inventive (LMWM***) | 6.9 | 7.1 | 7.1 | 6.8 |

*Approximately 50 respondents per variable. Attributes were evaluated on a scale from 1 to 9 with 9 indicating "Extremely liked." Hot pizzas were prepared with the indicated cheeses and tested.
**LMPS is inventive Low Moisture Part Skim Mozzarella.
***LMWM is inventive Low Moisture Whole Milk Mozzarella.

The following example are intended to illustrate the invention and not to limit it. Unless otherwise indicated, all percentages are by weight. Table 3, which appears after the examples, summarizes the formulations used in Examples 1–6.

EXAMPLE 1

The fluid media containing non-fat milk solids and fat was used to prepare mozzarella cheeses. Preferably the fat content ranges from about 3 to about 4 percent. The protein content ranges from about 3 to about 4 percent. The non-fat milk solids may be provided from whole milk, reconstituted dried non-fat milk solids, or skim milk. The fat may be milk fat or other suitable fat. The fat may be provided from whole milk, partially skimmed milk, or a suitable fat may be added.

Acidity was developed in the fluid media by the addition of a lactis-acid producing culture (Chris Hansen DVS) at a level of about 0.5 percent and the culture ripened for approximately about 30 minutes, to a pH of about 6.5 to about 7.0. Sufficient double strength rennet was added, and the mixture was set in about 30 minutes. The coagulum was then cut. The temperature raised to between 98 and 102° F. over a period of 30 to 35 minutes. After cooking, the curd was held at temperature for 10 minutes. About 30 to about 40 percent of the whey was removed from the vat, and the remaining curd and whey was agitated in the vat for about 20 minutes. At this time, the pH of the curd was between about 5.7 and 6.

Salt was added to the curd at this time to achieve a level of 1.7 percent in the finished- product. The resulting base curd was transferred to 500 lb. barrels where it was pressed using about 30 psi in a vacuum for 75 minutes to remove additional whey. The barrels were then sealed for storage. This curd is termed the "base curd."

The base curd was removed from the barrels, ground into small pieces (generally about ⅛ inches in diameter), and placed in a ribbon blender. The amount of base curd used was sufficient to provide between 62 and 64 percent of the finished product. Sweet cream and non-fat dry milk at 0.4 and 0.6 percent and 1.0 and 2.0 percent, respectively, were added. These ingredients were blended until thoroughly mixed (about 10 to about 15 minutes) to form the partially standardized base curd.

In a separate operation, pasteurized skim milk was ultra-filtered and diafiltered in a conventional process to yield a 6× skim milk retentate containing about 24 percent total solids, about 20 percent crude protein, and about 2 percent lactose. The skim milk retentate was then pasteurized, cooled, and transferred into tanks for culturing. Salt was added at about 1 percent as a processing aid in order to lower the viscosity. A lactic acid-producing culture was added and the mixture was allowed to ripen to pH 5.1 to about 5.7. Once the desired pH was achieved, the temperature of the cultured retentate was lowered to about 45° F. for storage. Optimally, the cultured retentate was used within 36 hours after cooling is started. Culturing the skim milk retentate has been shown to improve the performance of the product over the chill roll, and improved the stretch of the cheese when used on a pizza.

The partially standardized base curd in the blender was delivered into a direct steam injection lay-down cooker/stretcher. Simultaneously, cultured skim milk retentate and salt were added to the cooker at 26 percent and 1 percent, respectively. Once all the ingredients were blended in the cooker, the mixture was heated to a temperature of about 156 to about 160° F. through continuous direct steam injection over a period of 2 to 4 minutes. The cook cycle was maintained at about 158° F. at about 60 psi for about 2 minutes. The total amount of water added to the product through direct steam heating and process water adjustments in the cooker was about 6 percent of the total finished product. The single auger in the cooker/stretcher, was set at 95 to 105 rpm.

Once the desired cook temperature was attained, a hold time of at least two minutes is used to achieve the following: (a) formation of a stable cheese emulsion; (b) alignment of the protein in the cheese matrix which can impact stretchability of the finished product; and (c) destruction of vegetative pathogens. Generally, residence times greater than about 10 minutes at the cooking temperature should be avoided; otherwise, the emulsion may tend to break.

The molten cheese was moved into a surge tank where it was gravity fed to a chill roll cooler having an ammonia-chilled roll cooled to about temperature of 55° F. The sheet of cheese was cut into ribbons, the ribbons were stacked, cut lengthwise and dropped into a 500 pound barrel. Once the barrel was full, the cheese was pressed and the barrel sealed. The cheese barrels were placed in a cooler, and the cheese temperature was lowered to about 50° F. within about 72 hours. The cheese was stored at refrigerated or frozen temperatures until use.

EXAMPLE 2

Mozzarella cheese was manufactured using the same procedures as outlined in Example 1, except the UF/DF skim milk retentate was not cultured prior to use. After the retentate was pasteurized, it was cooled to 45° F. and transferred into tanks for storage until use. For best results, the retentate was used within 36 hours. If an adjustment to the finished product pH is desired, this can be accomplished through the addition, for example, of acetic acid (120 grain) or other suitable edible acid to the cooker/stretcher at a level of 1 to 1.4 percent of the finished product. The resulting mozzarella cheese has a composition of 50.5% moisture, 43.4 percent fat (on a dry basis), and 1.8 percent salt.

EXAMPLE 3

A base curd was manufactured using essentially the same procedure as outlined in Example 1. The base curd contained 53.4 percent FDB, 34.5 percent moisture, and 1.8 percent salt with a pH of 5.15. The amount of base curd employed to produce mozzarella cheese was such that it represented 60.0 percent of the finished cheese. The base curd was standardized in the blender as in Example 1 using (as a percentage of the finished product) 0.27 percent sweet cream, 1.14 percent non-fat dry milk, and 1.21 percent milk protein concentrate (New Zealand Alapro 4700 MPC). A cultured UF/DF skim milk retentate was made as outlined in Example 1. Salt, at a level of 0.23 percent of the finished product, and UF/DF skim milk retentate, at a level of 30.3 percent of the finished product, were added to the cooker/stretcher. The cheese was cooked-stretched through direct steam injection (adding 6.85 percent water to the finished product), cooled, and chilled as outlined in Example 1. The resulting mozzarella cheese had a composition of 50.5 percent moisture, 43.4 percent FDB, and 1.8 percent salt.

EXAMPLE 4

The base curd of Example 3, in an amount equivalent to 60 percent of the final product, was used. The base curd was partially standardized at the blender as in Example 1 using 0.21 percent sweet cream and 2.38 percent milk protein concentrate (New Zealand Alapro 4850 MPC). A cultured UF skim milk retentate (without diafiltration) was prepared using essentially the same procedure as in Example 1 (except, of course, the diafiltration step); the cultured UF skim milk retentate contained 24.0 percent solids, 19.4 percent crude protein, and 4.1 percent lactose. The skim milk retentate (at a level of 30.3 percent in the finished product) was added directly to the cooker at the same time as the partially standardized base curd was added. Salt, at a level of 0.23 percent of the finished product, was added to the cooker/stretcher. The cheese was cooked-stretched through direct steam injection (adding 6.9 percent water to the finished product), cooled, and chilled as outlined in Example 1. The resulting mozzarella cheese contained 50.5 percent moisture, 43.4 percent FDB, and 1.8 percent salt.

EXAMPLE 5

The base curd of Example 3, in an amount equivalent to 65.2 percent of the final product, was used. The base curd was partially standardized in the blender as in Example 1 using (as a percent of the finished product) 0.33 percent water, 2.0 percent sweet cream (containing 44 percent fat) and 1.57 percent non-fat dry milk. A cultured UF/DF skim milk retentate as prepared in Example 1 (23.7 percent of the finished product) and salt (0.36 percent of the finished product) was added to partially standardized base curd in the cooker/stretcher. The cheese was cooked-stretched through direct steam injection (adding 6.8 percent water to the finished product), cooled, and chilled as outlined in Example 1. The resulting low moisture whole milk mozzarella cheese contained 48.5 percent moisture, 46.6 percent FDB, and 1.8 percent salt.

EXAMPLE 6

Mozzarella cheese was manufactured essentially as outlined in Example 1 except that the base curd was made using an acid set process rather than the cultured process. Pasteurized milk was acidified through direct addition of a sufficient amount of 100 grain vinegar to lower the milk pH to 5.4 to 5.65. Except for the setting, essentially the same procedure as described in Example 1 was used. The resulting mozzarella cheese contained 50.5 percent moisture, 43.4 percent FDB, and 1.8 percent salt.

Table 3 summarizes the formulations used in Examples 1–6.

TABLE 3

| Ingredient | Ex. 1 | Ex. 2 | Ex. 3 | Ex. 4 | Ex. 5 | Ex. 6 |
| --- | --- | --- | --- | --- | --- | --- |
| Base Curd (50.5% FDB, 34.5% moisture) | 63.4% | 63.4% | — | — | — | 63.4% |
| Base Curd (53.4% FDB, 34.5% moisture) | — | — | 60.0% | 60.0% | 65.23% | — |
| UF/DF Skim Milk Retentate (cultured) | 23.4% | — | 30.3%* | — | — | 23.4% |
| UF/DF Skim Milk Retentate (non-cultured) | — | 23.4% | — | — | — | — |
| UF Skim Milk Retentate** | — | — | — | 30.3% | 23.7% | — |
| Sweet Cream | 0.53% | 0.53% | 0.27% | 0.21% | 2.0% | 0.53% |
| NFDM | 1.67% | 1.67% | 1.14% | — | 1.57% | 1.67% |

TABLE 3-continued

| Ingredient | Ex. 1 | Ex. 2 | Ex. 3 | Ex. 4 | Ex. 5 | Ex. 6 |
|---|---|---|---|---|---|---|
| Alapro 4700 MPC | — | — | 1.21% | — | — | — |
| Alapro 4850 MPC | — | — | — | 2.38% | — | — |
| Salt | 0.24% | 0.245 | 0.23% | 0.23% | 0.36% | 0.24% |
| Process Water | 10.76% | 10.76% | 6.85% | 6.88% | 7.14% | 10.76% |
| Acetic Acid (100 grain)*** | — | — | — | — | — | — |
| Total | 100.0% | 100.0% | 100.0% | 100.0% | 100.0% | 100.0% |

*UF/DF skim milk retentate used in Example 3 may be cultured or non-cultured
**May be cultured or non-cultured.
***May be used for pH adjustment at a level of 1.0 to 1.4% in finished product (displaces process water).

EXAMPLE 7

Using essentially the procedures as outlined in the previous examples, calcium-fortified mozzarella cheese can be prepared. A suitable calcium source (e.g., calcium chloride, calcium sulfate, calcium phosphate, and the like) can be added to the base curd, to the partially standardized base curd, or the finished product. Although the calcium level can be adjusted as desired (so long as organoleptic or other properties are not adversely affected), an especially preferred calcium level would provide about 200 and 260 mg calcium per serving size (typically about 28 g).

EXAMPLE 8

Mozzarella cheese was manufactured using essentially the same procedure as outlined in Example 1, except that starch (Ultra Sperse; National Starch and Chemical Co.) at 1.5 percent was mixed with the ultrafiltered and diafiltered skim milk retentate prior to addition in the lay-down cooker/stretcher. The resulting mozzarella cheese had enhanced firmness as compared to a similar product without starch; it could be shredded with same shred quality at slightly higher temperatures (i.e., about 1 to about 5° F. higher).

We claim:

1. A method of making mozzarella cheese, said method comprising:
    (A) preparing a base curd by a process comprising:
        (1) culturing a liquid dairy substrate using a lactic acid-producing culture;
        (2) coagulating the cultured liquid dairy substrate;
        (3) cutting the coagulated dairy substrate to form curds and whey;
        (4) separating and collecting the curds to form a base curd, wherein the base curd has a pH of about 5.0 to about 5.8 and is unstandardized;
        (5) storing the base curd under refrigeration or frozen conditions for a period of time until it is desirable to complete production of the mozzarella cheese, wherein the period of time is at least 14 days;
    (B) once it is desirable to complete production of the mozzarella cheese, grinding the base curd;
    (C) blending the ground base curd to form a partially standardized base curd;
    (D) cooking the partially standardized base curd in a cooker/stretcher at a temperature of about 140 to about 165° F. with a cheese mass residence time in the cooker/stretcher of about 2 to about 4 minutes, wherein an ultrafiltered or an ultrafiltered/diafiltered skim milk retentate is added in the cooker/stretcher to form a standardized curd;
    (E) rapidly cooling the standardized curd to form the mozzarella cheese, wherein the standardized curd is cooled to below about 60° F. in about 4 minutes or less; and
    (F) packaging the mozzarella cheese,
    wherein the moisture, fat, and protein levels of the mozzarella cheese are standardized in the blender or the cooker stretcher with the proviso that the ultrafiltrated or an ultrafiltered/diafiltered skim milk retentate is added to the partially standardized base curd during cooking.

2. The method as in claim 1, wherein the lactic acid-producing culture is selected from the group consisting of *Streptococcus lactis, Lactococcus lactis*, and mixtures thereof.

3. The method as in claim 1, wherein the mozzarella cheese has a fat content of about 19 to 26 percent and a protein content of about 18 to about 21 percent.

4. The method as in claim 1, wherein the liquid dairy substrate is skim milk.

5. The method as in claim 1, wherein the moisture, fat, and protein levels are standardized by the addition of cream at a level of about 0.1 to about 2 percent, non-fat dry milk at a level of about 1 to about 4 percent, and the ultrafiltered or the ultrafiltered/diafiltered skim milk retentate at a level of about 20 to about 30 percent, based on the weight of the mozzarella cheese; wherein the cream and non-fat dry milk is added in the blender or in the cooker/stretcher; and wherein salt is added in the cooker/stretcher at a level of 0 to about 2 percent, based on the weight of the mozzarella cheese.

6. The method as in claim 1, wherein the ultrafiltered or the ultrafiltered/diafiltered skim milk retentate is cultured ultrafiltered or ultrafiltered/diafiltered skim milk retentate.

7. The method as in claim 1, wherein the blender is a ribbon blender, wherein the cooker/stretcher is a direct steam injection lay-down cooker/stretcher, and wherein the standardized curd is rapidly cooled using a chill roll cooling unit.

8. The method as in claim 1, wherein the lactic acid-producing culture is *Streptococcus lactis*; wherein the liquid dairy substrate is skim milk; and wherein the mozzarella cheese has a fat content of about 19 to 26 percent and a protein content of about 18 to about 21 percent.

9. The method as in claim 8, wherein the moisture, fat, and protein levels are standardized by the addition of cream at a level of about 0.1 to about 2 percent, non-fat dry milk at a level of about 1 to about 4 percent, and the ultrafiltered or the ultrafiltered/diafiltered skim milk retentate at a level of about 20 to about 30 percent, based on the weight of the mozzarella cheese; wherein the cream and non-fat dry milk is added in the blender or in the cooker/stretcher; wherein salt is added in the cooker/stretcher at a level of 0 to about 2 percent, based on the weight of the mozzarella cheese; wherein the ultrafiltered or the ultrafiltered/diafiltered skim milk retentate is cultured ultrafiltered or ultrafiltered/ diafiltered skim milk retentate; wherein the blender is a ribbon blender; wherein the cooker/stretcher is a direct steam injection lay-down cooker/stretcher; and wherein standardized curd is rapidly cooled using a chill roll cooling unit.

10. The method as in claim 1, wherein starch is added at a level of about 0.1 to about 2 percent, based on the weight of the mozzarella cheese, in the cooker/stetcher.

11. A method of making natural mozzarella cheese, comprising:

(1) culturing a liquid dairy substrate using a lactic acid-producing culture;

(2) coagulating the cultured liquid dairy substrate to generate an unstandardized curd;

(3) cutting and salting the unstandardized curd to form a base curd;

(4) storing the base curd under refrigeration or frozen temperatures for a period of time until it is desirable to complete production of the mozzarella cheese, wherein the period of time is at least 14 days;

(5) once it is desirable to complete production of the mozzarella cheese, grinding the base curd;

(7) blending the ground base curd with cream and non-fat dry milk to form a partially standardized base curd;

(8) cooking the partially standardized base curd in a cooker/stretcher at a temperature of about 140 to about 165° F. with a cheese mass residence time in the cooker/stretcher of about 2 to about 4 minutes, wherein an ultrafiltered or an ultrafiltered/diafiltered skim milk retentate and salt are added in the cooker/stretcher to form a standardized curd;

(9) rapidly cooling the standardized curd to form the mozzarella cheese, wherein the standardized curd is cooled to below about 60° F. in about 4 minutes or less;

(10) packaging the natural mozzarella cheese wherein moisture, fat, salt, and protein levels of the mozzarella cheese are standardized in the blender or the cooker stretcher by the addition of the cream, the non-fat dry milk, the salt, and the ultrafiltrated or the ultrafiltered/diafiltered skim milk retentate.

12. The method as in claim 11, wherein starch is added at a level of about 0.1 to about 2 percent, based on the weight of the mozzarella cheese, the protein content of the finished natural mozzarella cheese is between about 18 and about 21 percent.

13. The method cheese as in claim 11, wherein the ultrafiltered or the ultrafiltered/diafiltered skim milk retentate is cultured ultrafiltered or ultrafiltered/diafiltered skim milk retentate.

14. The method as in claim 12, wherein the ultrafiltered or the ultrafiltered/diafiltered skim milk retentate is cultured ultrafiltered or ultrafiltered/diafiltered skim milk retentate.

15. The method as in claim 11, wherein the blender is a ribbon blender, wherein the cooker/stretcher is a direct steam injection lay-down cooker/stretcher, and wherein the standardized curd is rapidly cooled using a chill roll cooling unit.

16. The method as in claim 12, wherein the blender is a ribbon blender, wherein the cooker/stretcher is a direct steam injection lay-down cooker/stretcher, and wherein the standardized curd is rapidly cooled using a chill roll cooling unit.

17. The method as in claim 13, wherein the blender is a ribbon blender, wherein the cooker/stretcher is a direct steam injection lay-down cooker/stretcher, and wherein the standardized curd is rapidly cooled using a chill roll cooling unit.

18. The method as in claim 14, wherein the blender is a ribbon blender, wherein the cooker/stretcher is a direct steam injection lay-down cooker/stretcher, and wherein the standardized curd is rapidly cooled using a chill roll cooling unit.

* * * * *

UNITED STATES PATENT AND TRADEMARK OFFICE
CERTIFICATE OF CORRECTION

PATENT NO. : 6,475,538 B2
DATED : November 5, 2002
INVENTOR(S) : Thakar et al.

It is certified that error appears in the above-identified patent and that said Letters Patent is hereby corrected as shown below:

<u>Column 12,</u>
Line 19, change "cooker stretcher" to -- cooker/stretcher --.

<u>Column 14,</u>
Lines 1-2, change "cooker stretcher" to -- cooker/stretcher --.

Signed and Sealed this

Seventeenth Day of June, 2003

JAMES E. ROGAN
*Director of the United States Patent and Trademark Office*